INVENTORS.
EMMETT B. SHUTES
CARL A. GUSTAVSON

INVENTORS.
EMMETT B. SHUTES
CARL A. GUSTAVSON

United States Patent Office 3,345,857
Patented Oct. 10, 1967

3,345,857
CALIBRATION GAUGE FOR USE WITH
BOREHOLE CALIPERS
Emmett B. Shutes, Turtle Creek, and Carl A. Gustavson, Verona, Pa., assignors to Gulf Research & Development Company, Pittsburgh, Pa., a corporation of Delaware
Filed Feb. 21, 1967, Ser. No. 617,586
7 Claims. (Cl. 73—1)

ABSTRACT OF THE DISCLOSURE

A multi-diameter gauge for a borehole caliper of the feeler arm type comprising a central hub to slidingly fit the body of the caliper, having a plate extending outwardly from one end of the hub, and a plurality of sets of gauging members extending from the plate. The number of members in each set are equal to the number of feeler arms on the caliper, with the members of each set being located at a predetermined distance from the axis of the caliper and staggered with respect to the other sets.

---

Figure 1:
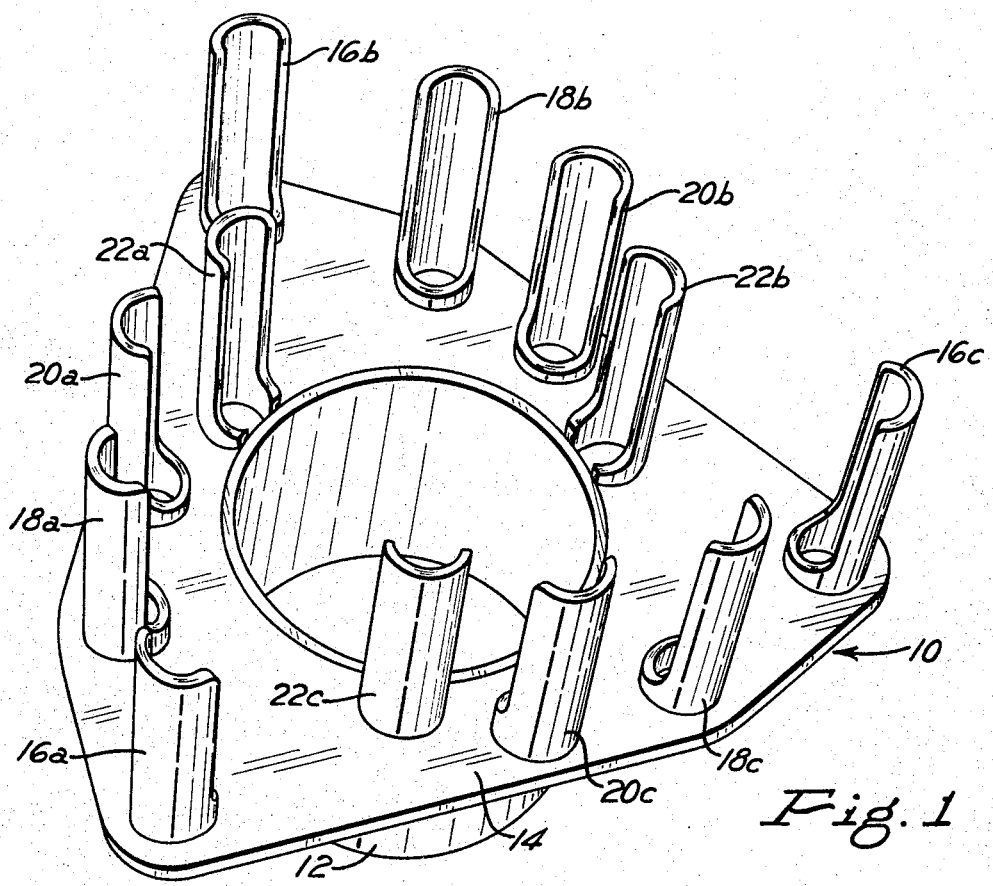

This invention relates to the art of well logging and more particularly to a calibration gauge for use with a borehole caliper of the type which comprises a plurality of arms adapted to extend outwardly from the body of the tool to contact the borehole side wall. A problem in the use of such calipers is setting or calibrating the tool before a run. Heretofore, ring gauges were used. These ring gauges were hand held around the outer ends of the feeler arms while calibration adjustments were made at the control panel by the operator. Inaccuracies resulted from this method in that perpendicularity of the gauge to the axis of the tool and the concentricity between the ring gauge and the body of the tool were determined by sight by the assistant holding the ring gauge. The errors were compounded because for each calibration several ring gauges were used, and hence several such hand held settings were made. Another disadvantage in the ring gauge method of calibration was that a great deal of time was consumed in making one calibration.

Another disdvantage of the ring gauging method of calibration is that there is a real danger of physical harm to the assistant using the ring gauges. The arms of the caliper tool are spring loaded outwardly, and if the tips of the arms should slip out of the ring gauge, he could be hurt.

Still another disadvantage of the ring gauge method of calibration is that the caliper tool should be in a vertical position during calibration. This is required because otherwse the concentricity error is compounded by the gravity effect on the ring gauge. In the present invention, calibration may be accomplished with the caliper tool in any attitude. Besides the convenience advantage of having the tool in any attitude while being calibrated, another advantage is that calibration can be accomplished by only one operator by laying the tool down with the gauge on it near the control panel.

The present invention comprises a simple and easily used gauge to accurately calibrate borehole caliper tools of the character described. Gauges embodying the invention comprise a central collar of predetermined diameter to snugly and slideably fit around the body of the tool. A flat support plate extends outwardly from one end of the collar and carries a plurality of sets of gauging members. Each set of gauging members comprises a number of members equal to the number of feeler arms on the tool. The members of each set are set at the same radial distance from the center line of the gauge. Each set of members is at a different radius, and is offset from the other sets. The gauge is slipped over the tool and the feeler arms are adjusted accurately, quickly and easily to one predetermined radius determined by one set of gauging members, and then by merely moving the gauge along the tool to remove the feeler arms from this first set of gauging members and moving another set of gauging members into contact with the ends of the feeler arms, the tool is calibrated.

Figure 2:
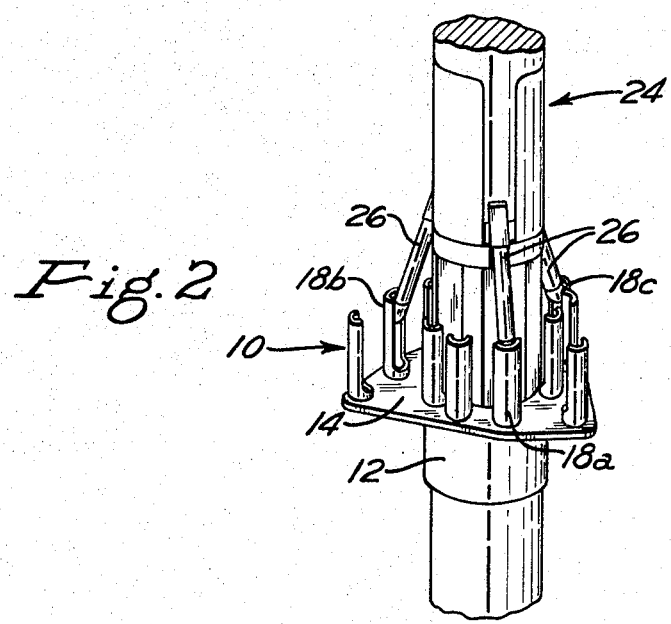
Figure 3:
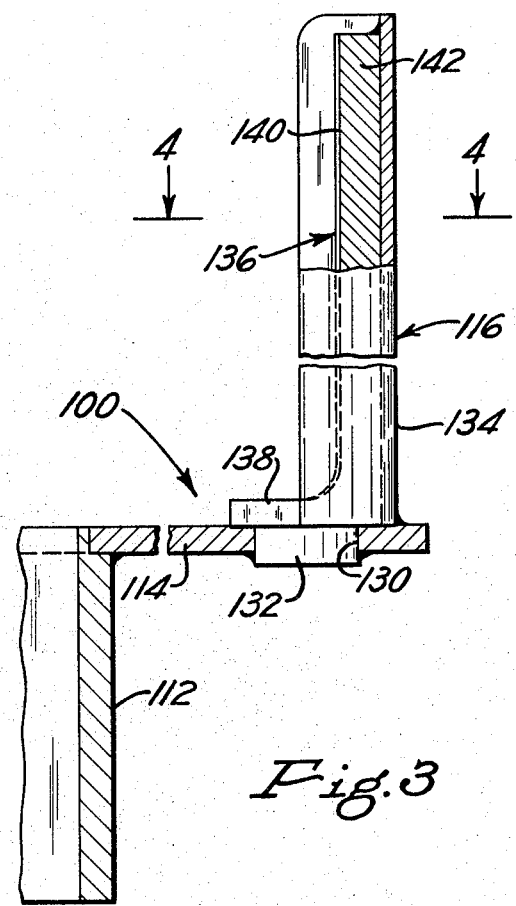
Figure 4:
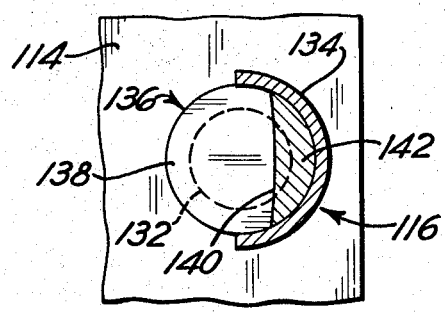

In the accompanying drawing forming a part of this disclosure; FIG. 1 is a perspective view of a calibration gauge embodying the invention; FIG. 2 is a perspective view of the calibration gauge of FIG. 1 shown in use on a borehole caliper tool; FIG. 3 is a partial vertical view showing a modified structure of the gauging members with some parts broken away and in cross-section; and FIG. 4 is a cross-sectional view taken on line 4—4 of FIG. 3.

Referring now in detail to the drawing, 10 designates a gauge embodying the invention. Gauge 10 comprises a central hub 12, from one end of which extends a main plate 14. Mounted on plate 14 are a plurality of sets of gauging members 16, 18, 20, and 22, each comprising three members, 16a, 16b, 16c; 18a, etc. The sets of gauging members 16, 18, 20, and 22 are staggered with respect to each other for a reason that will appear below. The gauging members extend outwardly from plate 14 to the other side thereof with respect to hub 12.

The gauging members are all of similar configuration and each comprises a length of tubular material split longitudinally in half for substantially its entire length, to form a small full tubular portion at the end at which it is joined to main plate 14. The members themselves can thus be fabricated using one jig or die. Thus, gauge 10 can be simply fabricated by drilling holes in the plate 14 at the appropriate places, and inserting and securing the gauge members 16, 18, 20, and 22 to face towards the centerline, as shown.

Referring to FIG. 2, there is shown a borehole caliper tool 24. Tool 24 is a feeler arm type of borehole caliper. One tool with which the gauge of the invention has been used is manufactured by Birdwell Division of Seismograph Service Corporation of Tulsa, Okla., and is known as their model number LEEB-6001. It has a diameter of 3⅝ inches, and is supplied with various sets of feeler arms adaptable to operate in various ranges of borehole diameters ranging from 4 to 30 inches overall. Gauge 10, as shown, is intended for use with the shorter sets of arms, but it will of course be understood that plate 14 will be enlarged and a set of gauging members at a larger radius will be provided to calibrate for larger diameters. Tool 24 comprises three feeler arms 26. Tool 24 includes a drive system within it which extends and retracts arms 26, and which is controlled at the surface. The arms 26 are independently operative when measuring. The electrical system within tool 24 comprises three potentiometers individually operated by each of the arms 26. The potentiometers are wired into a Wheatstone bridge circuit, which includes maximum and minimum diameter adjusting potentiometers, and which also operates any suitable recording means such as a pen and strip chart recorder.

In FIG. 2, tool 24 is shown being calibrated to the diameter determined by the set of gauging members 18. After the operator has set the controls to the known diameter determined by members 18, gauge 10 is moved away and turned to another set of gauging members, the gauge is moved towards the arms, the arms are operated from the control panel until they engage a different set of members defining a different known diameter, and the calibration is complete.

In FIGS. 3 and 4, there is shown a modified tool 100 comprising a central hub 112 and a main plate 114. A modified gauging member 116 is provided. It will be understood that members 118, 120, and 122, similar to member 116 and analogous to members 18, 20 and 22, are also provided but are not shown. Gauging member 116 is slightly more complex to fabricate than gauging members 16, 18, 20 and 22, but gauging member 116 has the advantage that a more accurate calibration can be made when working with a borehole caliper tool in which the tips of the feeler arms are slightly worn. This desideratum is achieved through the use of an additional fillet member nested within a combined tubular support and shrouding member. The fillet member is fabricated to have an inside surface described by a radius equal to the radius to which it is desired to calibrate. In gauging members 16, 18, 20 and 22 the desired radius is located at the innermost point of curvature of the gauging member. It cannot be said that either embodiment of the invention is generally better than the other since each embodiment is more advantageously suited to certain conditions than the other. For example, the first embodiment could be used generally, and the second embodiment could be used in deep cased hole work.

Main plate 114 is formed with pilot holes 130 in which pilots 132 of the gauging members are seated to locate the gauging members on the plate. Each gauging member 116 comprises an outer shroud portion 134 which comprises a length of tubular stock split longitudinally for substantially its entire length. The gauging member 136 is fabricated by machining from a solid cylinder, die casting, or any other suitable means. A bottom portion 138 of the cylinder is allowed to remain whole to serve as a shoulder for pilots 132. The remainder of the length of gauging member 136 is cut away down to an internal surface 140 which is fabricated to the particular radius at which that particular gauging member will be located on plate 114.

Thus, the wing portions of shroud 134 extending beyond surface 140 serve to confine the tips of the caliper tool arms, and the surface 140 accurately gauges said tips, even in the extreme condition where the tips are worn. The upper, free end of the support portion 134 extends up above the upper free end of stock 142 to permit welding. If the gauging member 116 were fabricated in one piece, this extension could be omitted.

As shown in FIG. 3, the various parts may be welded together or joined by any other suitable means.

While the invention has been described in some detail above, it is to be understood that this detailed description is by way of example only, and the protection granted is to be limited only within the spirit of the invention and the scope of the following claims.

We claim:
1. A gauge for use in calibrating a borehole caliper tool of the feeler arm type comprising a central hub formed with an opening adapted to slidingly fit snugly over the body of the tool, a plurality of sets of gauging members, means to support said gauging members in fixed relation to said central hub, each of said sets of members comprising a number of members equal to the number of feeler arms on said tool, all of the members of each set of members having gauging means at the same radial distance from the centerline of said hub opening, and the radial distance from the centerline of said opening to each set being different.

2. The combination of claim 1, each of said gauging members comprising a tubular member split for substantially its entire length and facing towards said hub centerline.

3. The combination of claim 1, wherein said members are parallel to said central hub.

4. The combination of claim 1, the gauging members of each of said sets of members being staggered with respect to each other, whereby said tool may be calibrated by first positioning the feeler arms of the tool in one set of members, and then moving said first set of members away from said feeler arms, turning the gauge and repositioning the ends of the feeler arms into another set of members.

5. The combination of claim 1, said gauging means of each of said gauging members of each of said sets of gauging members comprising a portion formed with an acurate surface having a radius substantially equal to the radius to be gauged by that set of gauging members.

6. The combination of claim 5, each of said gauging members further comprising a tubular member enshrouding said gauging portion, whereby the extensions of said tubular member beyond said arcuate surface confine the tips of the feeler arms to contact with said arcuate surface.

7. The combination of claim 1, said support means comprising a plate portion extending outwardly from said hub generally transverse to said opening.

No references cited.

SAMUEL S. MATTHEWS, *Primary Examiner.*